(12) United States Patent
Short

(10) Patent No.: US 8,827,248 B2
(45) Date of Patent: Sep. 9, 2014

(54) MATRIX ARRANGEMENT

(75) Inventor: Gary Anthony Short, Kirkby-in-Ashfield (GB)

(73) Assignee: Coldharbour Marine Limited, Alfreton, Derbyshire (GB)

( * ) Notice: Subject to any disclaimer, the term of this patent is extended or adjusted under 35 U.S.C. 154(b) by 1060 days.

(21) Appl. No.: 12/293,769

(22) PCT Filed: Mar. 21, 2007

(86) PCT No.: PCT/GB2007/001007
§ 371 (c)(1),
(2), (4) Date: Jan. 12, 2009

(87) PCT Pub. No.: WO2007/107754
PCT Pub. Date: Sep. 27, 2007

(65) Prior Publication Data
US 2009/0151915 A1    Jun. 18, 2009

(30) Foreign Application Priority Data

Mar. 21, 2006  (GB) ................................. 0605599.0

(51) Int. Cl.
| | |
|---|---|
| *B01F 3/04* | (2006.01) |
| *F28C 1/04* | (2006.01) |
| *F28F 25/04* | (2006.01) |
| *F28C 3/06* | (2006.01) |
| *F28F 25/08* | (2006.01) |

(52) U.S. Cl.
CPC ................ *F28F 25/087* (2013.01); *F28C 1/04* (2013.01); *F28F 25/04* (2013.01); *F28C 3/06* (2013.01)
USPC ...................... 261/112.1; 261/112.2; 261/113

(58) Field of Classification Search
USPC ............................. 261/30, 112.1, 112.2, 113
See application file for complete search history.

(56) References Cited

U.S. PATENT DOCUMENTS

| | | | | |
|---|---|---|---|---|
| 2,470,652 | A | * | 5/1949 | Scofield ........................... 261/94 |
| 3,010,706 | A | * | 11/1961 | McWilliams ................. 261/100 |
| 3,346,246 | A | | 10/1967 | Loetel et al. |
| 3,398,060 | A | * | 8/1968 | Cowley ........................... 203/11 |
| 3,415,502 | A | * | 12/1968 | Munters ..................... 261/112.2 |
| 3,947,532 | A | * | 3/1976 | Skold et al. ................ 261/112.2 |
| 4,105,724 | A | * | 8/1978 | Talbot ........................ 261/112.1 |
| 4,304,738 | A | * | 12/1981 | Nutter ............................. 261/94 |
| 4,501,707 | A | * | 2/1985 | Buhlmann ....................... 261/94 |
| 4,562,015 | A | * | 12/1985 | Lefevre ........................... 261/94 |
| 4,782,857 | A | | 11/1988 | Bieri |
| 4,934,663 | A | * | 6/1990 | Phelps ........................ 261/112.2 |
| 5,185,106 | A | * | 2/1993 | Chen et al. ................. 261/112.2 |
| 6,096,407 | A | | 8/2000 | Vodicka |
| 6,325,361 | B1 | * | 12/2001 | Van Duijn ..................... 261/113 |
| 6,511,051 | B2 | * | 1/2003 | Kessler ........................... 261/94 |

FOREIGN PATENT DOCUMENTS

| | | |
|---|---|---|
| DE | 1601144 | 11/1970 |
| DE | 19733480 A1 | 2/1999 |
| FR | 869527 | 2/1942 |
| FR | 1164420 | 10/1958 |
| GB | 607284 | 8/1948 |
| JP | 2003202191 A | 7/2003 |
| JP | 3112756 U | 8/2005 |

* cited by examiner

*Primary Examiner* — Charles Bushey
(74) *Attorney, Agent, or Firm* — Chernoff Vilhauer McClung & Stenzel LLP

(57) ABSTRACT

The matrix arrangement for use in heat transfer and/or cleaning assemblies comprises a sheet, the sheet defining a plurality of apertures for the flow of a first fluid therethrough. The arrangement is arranged for the flow of a second fluid over the sheet, so that the first and second fluids cross one another for heat transfer and/or cleaning.

23 Claims, 5 Drawing Sheets

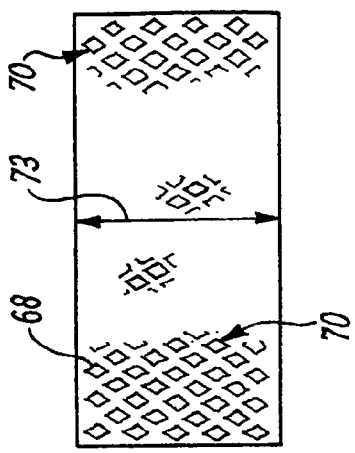
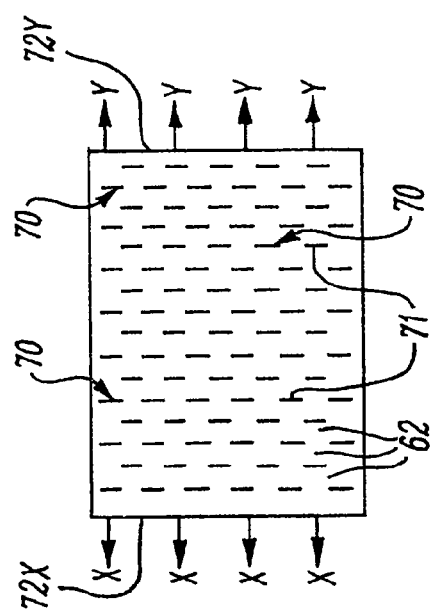
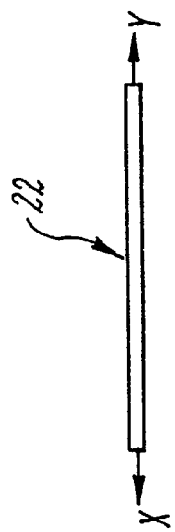
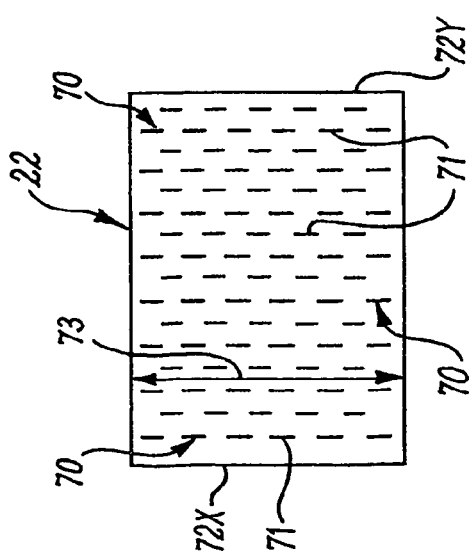
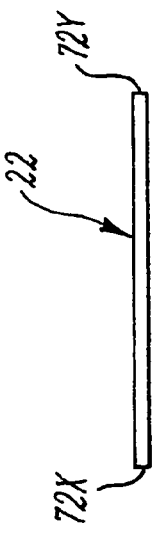

MATRIX ARRANGEMENT

This is a national stage application filed under 35 USC 371 based on International Application No. PCT/GB2007/001007 filed Mar. 21, 2007, and claims priority under 35 USC 119 of United Kingdom Patent Application No. 0605599.0 filed Mar. 21, 2006.

This invention relates to matrix arrangements. More particularly, but not exclusively, the invention relates to matrix arrangements for use in heat transfer and/or cleaning assemblies. Embodiments of the invention relate to heat transfer and/or cleaning assemblies incorporating matrix arrangements.

In the marine and chemical engineering industries, it is often necessary to cool, and sometimes clean, hot gases. Known apparatus for doing this consists of the use of a water spray only, or of the use of packed columns. By being brought into intimate contact with a liquid such as water the gas can be cooled and/or cleaned. Such operations are also known as quenching or scrubbing. However, known apparatus can take up too much space or result in a low temperature change.

According to one aspect of this invention, there is provided a matrix arrangement, the matrix arrangement comprising a sheet, the sheet defining a plurality of apertures for the flow of a first fluid therethrough, the arrangement being arranged for the flow of a second fluid over the sheet so that the first and second fluids cross one another for heat transfer and/or cleaning.

Possibly the arrangement includes a plurality of sheets, which may together define at least one channel therebetween, along which the second fluid may flow in use.

The or each sheet may comprise a mesh. The or each mesh may comprise a plurality of elongate members such as wires. The elongate members may engage adjacent elongate members intermittently to define said apertures. Each elongate member may have a generally sinusoidal configuration. The or each mesh may comprise an expanded mesh, and may comprise a raised expanded mesh. The or each mesh may be formed of metal, and may be formed of a corrosion resistant metal such as stainless steel.

The apertures in the mesh may be of a diamond shape.

Each elongate member may include a fluid contact surface, which in use may contact the second fluid. Possibly, the fluid contact surface of one elongate member forms a substantially continuous surface with the fluid contact surface of adjacent elongate members.

Possibly, each fluid contact surface is orientated at a first angle to the sheet of which it forms part. The or each sheet may be substantially planar, and the first angle may be between the fluid contact surface and the plane of the sheet.

Possibly, the first angle may be between 5° and 85°, and more possibly is between 30° and 50°.

Possibly, the or each sheet is orientated at an angle to the vertical, which forms a second angle. Possibly, the second angle is between 0° and 45°, and may be between 5° and 16°. Possibly, the second angle is substantially 11°.

The sheets may be arranged so that the or each channel has a diamond shaped profile.

The or each channel may be elongate, may be generally upright, and may be arranged at substantially the second angle to the vertical.

In one embodiment, the sheets may define a plurality of channels, and each of the channels may be substantially parallel to the other channels. The sheets may criss-cross or intersect one another to provide the channels. The sheets may define a plurality of rows of the channels.

The arrangement may be for heat transfer and/or cleaning. The arrangement may be for cleaning the first fluid, and/or may be for cooling the first fluid. The first fluid may be a gas. The second fluid may be a liquid, and may be water.

According to another aspect of this invention, there is provided an assembly for heat transfer or cleaning, the assembly comprising a first pathway for a first fluid, a second pathway for a second fluid, wherein the first and second pathways cross each other at a fluid crossing region, the assembly including a fluid contact arrangement disposed at said fluid crossing region, the fluid contact arrangement allowing the first and second fluids to contact one another to effect heat transfer and/or cleaning.

In the preferred embodiment, the fluid contact arrangement comprises a matrix arrangement as described above.

The first pathway may be for gases to be cooled or cleaned, and the second pathway may be for a cooling or cleaning liquid, such as water.

The matrix arrangement may be arranged such that the first pathway extends thereto generally transverse to the aforesaid plurality of sheets. The second pathway may extend thereto to provide flow of the second fluid through the channels. Thus, the second fluid can flow along said channels over the fluid contact surfaces of the sheets.

Preferably, the assembly includes a fluid exhaust means to exhaust the first fluid from the assembly. The fluid exhaust means preferably includes a separator to separate the second fluid from the first fluid. The second fluid may be in the form of droplets.

The fluid exhaust means preferably includes a vane member to slow the first fluid and allow the entrained second fluid to separate therefrom. The fluid exhaust means may also include a separation chamber. The vane member may be provided in an interior conduit within the separation chamber. Preferably, the interior conduit terminates at an open end thereof within the separation chamber. The open end may be flared.

The assembly may comprise a fluid guide means for guiding the first and second fluid. Preferably the fluid guide means comprises a generally cylindrical guide member, which may extend around the fluid contact arrangement.

The cylindrical guide member may comprise inner and outer skins. The second fluid pathway may extend between the inner and outer skins. Preferably, the second fluid pathway is above the fluid contact arrangement.

The cylindrical guide member may comprise feed means to feed the second fluid to the fluid contact arrangement. The feed means may comprise a pair of spaced substantially parallel walls and a base member. The base member may define a plurality of holes to feed the second fluid to the fluid contact arrangement. The holes may be slots.

The assembly may include a fluid outlet to allow the second fluid to be removed from the assembly. The fluid outlet is preferably provided below the guide member.

Spray means may be provided to spray further second fluid onto the first fluid exiting from the fluid contact arrangement. The second fluid sprayed from the spray means provides further cooling and/or cleaning of the first fluid.

An embodiment of the invention will now be described by way of example only, with reference to the accompanying drawings, in which:

FIGS. 3A and 3B show respectively a top plan view and a side view of a sheet for forming a mesh;

FIGS. 4A and 4B show respectively a top plan view and a side view of the sheet being stretched;

FIGS. 5A and 5B show respectively a top plan view and a side view of the sheet after stretching forming the mesh;

Figure 1:
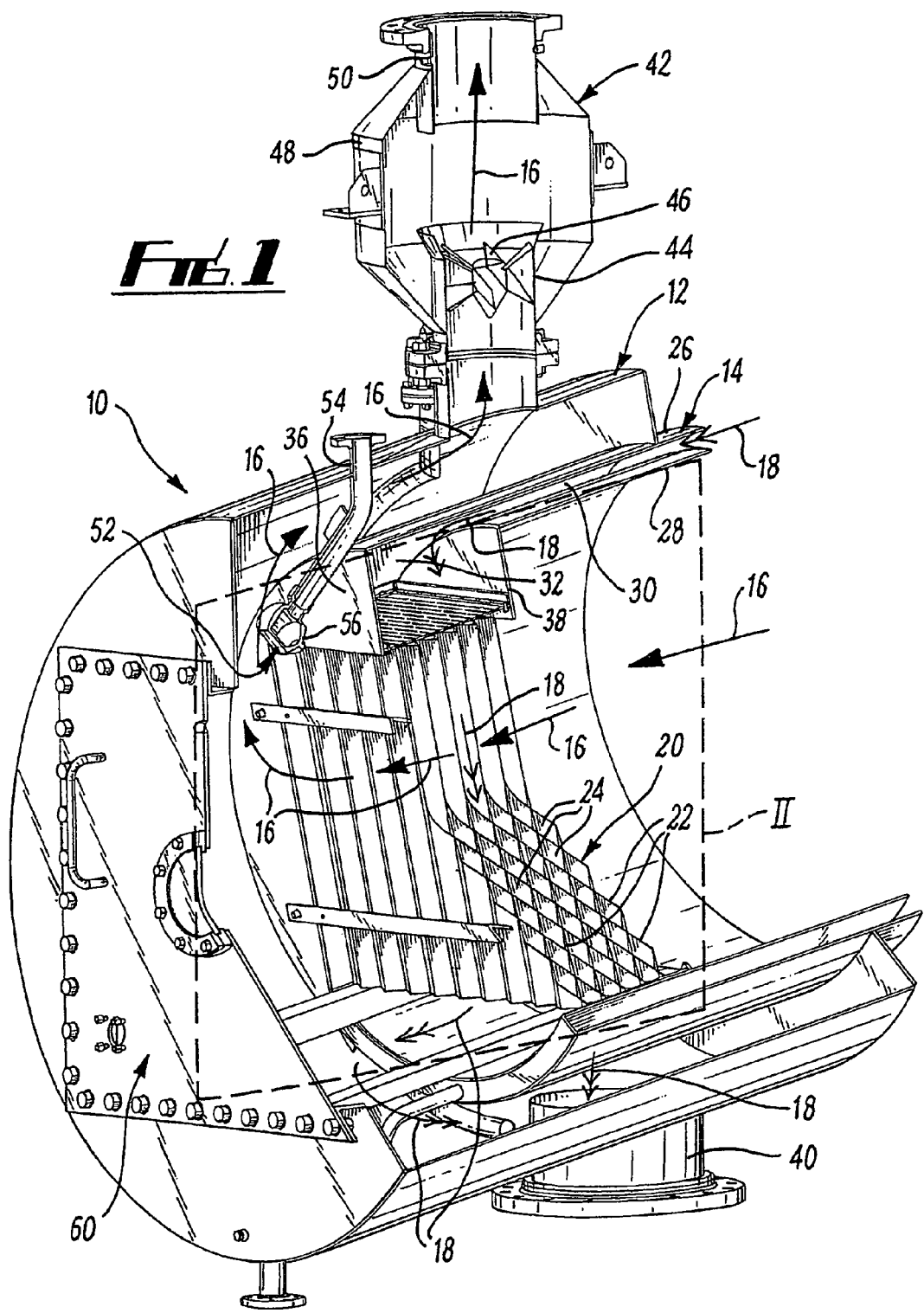
FIG. 1 is a perspective view of a heat transfer and/or cleaning assembly, with parts cut away to show internal components.

Referring to the drawings, there is shown a heat transfer assembly 10 which comprises an outer or main housing 12 which is of a cylindrical configuration, and a concentric inner or subsidiary housing 14.

The heat transfer assembly 10 defines a first pathway 16 for the flow of a gas to be cooled and/or scrubbed, and a second pathway 18 for the flow of cooling and scrubbing water.

Figures 2, 2A:
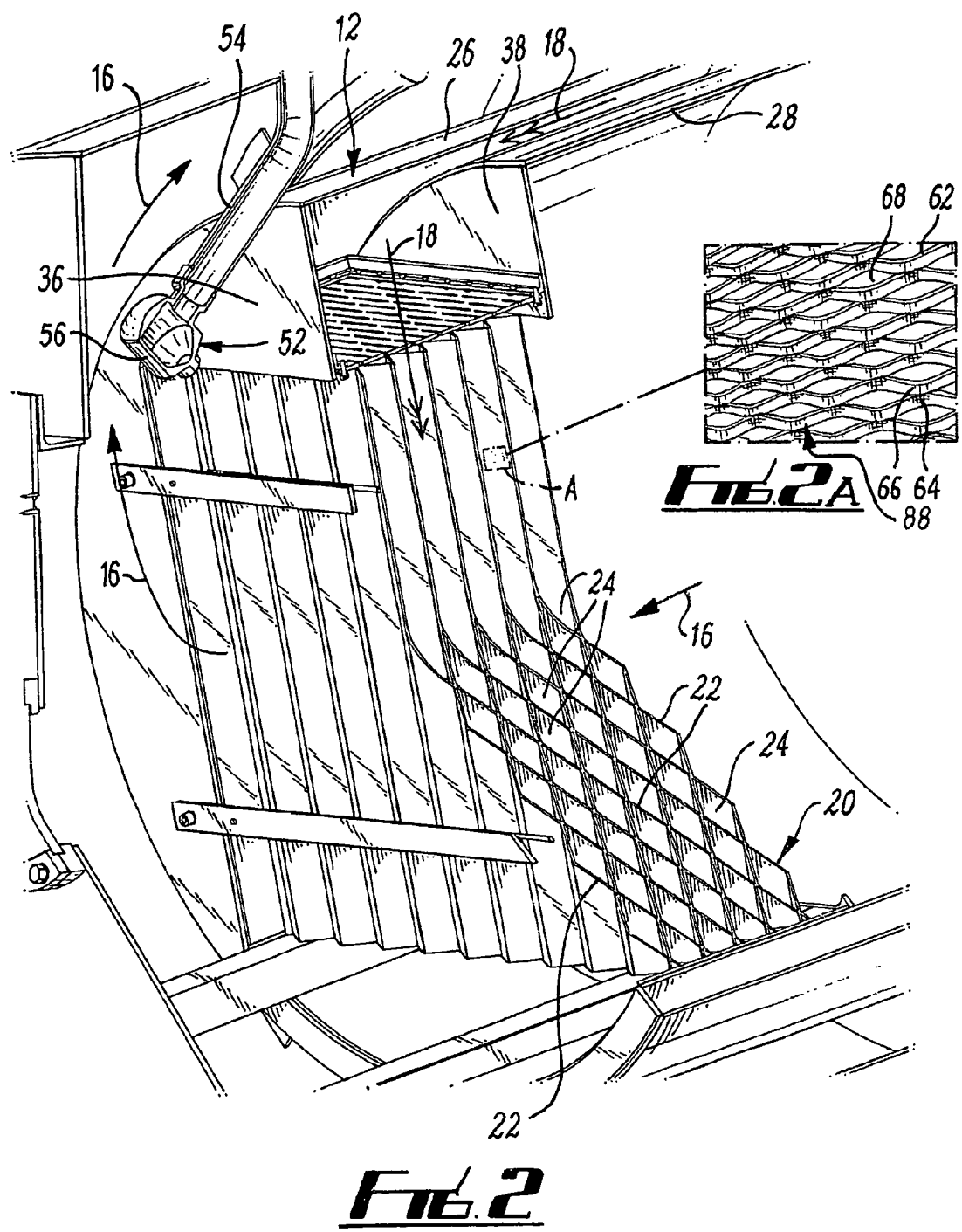
FIG. 2 is a close-up view of the region marked II in FIG. 1.
FIG. 2A is a close-up view of the region marked A in FIG. 2.

The assembly 10 also includes a matrix arrangement 20, which is shown more clearly in FIG. 2, and comprises a plurality of sheets 22 of a mesh material which are arranged to define a plurality of channels 24 each having a diamond shaped profile. The channels 24 extend generally vertically to accommodate the flow of water 18 through the matrix arrangement 20. As can be seen, there are a plurality of rows of the channels 24 extending across the matrix arrangement 20.

The inner casing 14 comprises first and second concentric skins 26, 28. The skins 26, 28 have an upper region defining a guide member in the form of a conduit 30, providing part of the second fluid path 18.

Feeding means in the form of a water dispersion region 32 is provided above the matrix arrangement 20 and is defined to the front and rear by a first wall 36 depending from the first skin 26, and a second wall 38 depending from the second skin 28. The dispersion chamber 32 is also defined by the skin 26 extending around the matrix arrangement 20.

The heat transfer assembly also includes a fluid outlet conduit 40 extending from a lower region of the outer casing 12. The fluid outlet 40 allows cooling water which has been heated by the gas flowing across the matrix arrangement 20 to exit from the heat transfer arrangement 10.

The heat transfer arrangement 10 also includes a fluid exhaust arrangement 42 which comprises an interior conduit 44 which includes vane members 46 arranged centrally within the conduit 44 adjacent the exit of the conduit 44. The fluid exhaust arrangement 42 also includes a separation chamber 48 to allow any water droplets in the gas being exhausted to be separated therefrom.

Figure 1A:
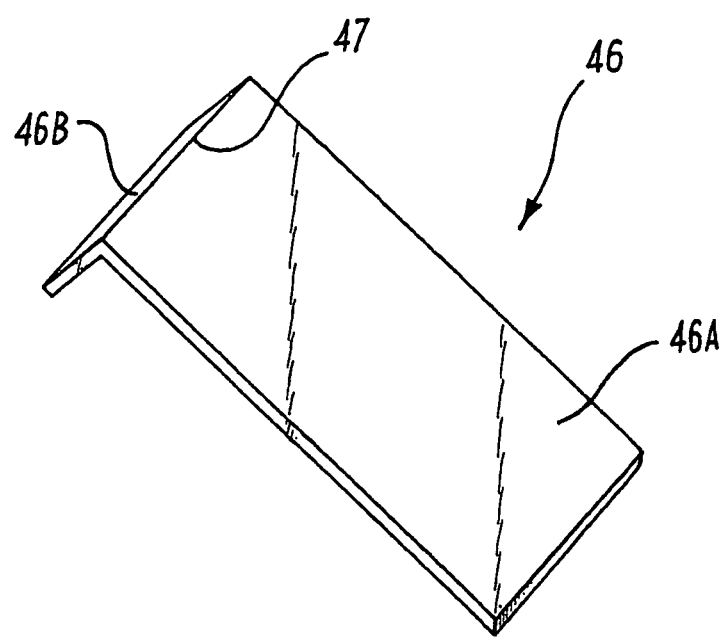
FIG. 1A shows a close up view of a vane member.

The vane members 46 are provided to catch the water droplets in the gas flowing through the exhaust arrangement 42 and allow the water droplets therein to separate therefrom. One of the vane members 46 is shown in FIG. 1A. It comprises a main portion 46A and a hook portion 46B extending along an edge 47 of the main portion 46A. The hook portion 46B is provided to catch the water droplets to separate them from the gas flowing through the exhaust arrangement 42.

The fluid exhaust arrangement 42 also includes an exhaust conduit 50 provided at the top of the separation chamber 48 through which the gas can be exhausted. As can be seen from FIG. 1, the exit of the interior conduit 44 is flared outwardly.

The heat transfer assembly 10 also includes spray means 52 having a feed conduit 54 attached to a supply of water and a spray nozzle 56 to spray water over the gas exiting from the matrix arrangement 20.

The spray means 52 provides enhanced cooling of the gas flowing along the pathway 16.

A service access door 60 is provided at one end of the main housing 12 to allow access for servicing of the heat transfer assembly 10.

Referring to FIG. 2A there is shown a section of one of the sheets 22 of the mesh material. As can be seen, the mesh material forming the sheet 22 comprises a plurality of elongate members in the form of flattened wires 62, each being arranged in a sinusoidal wave-like configuration where the crests 64 of one wave are attached to trough 66 of each adjacent wave, and vice-a-versa. This provides apertures 68 in the mesh which are of a generally diamond-shaped configuration. The wires 62 are generally of a flattened configuration having a height which is less than their width. The sheets 22 could be formed of a metal, which could be corrosion resistant, and could be a stainless steel.

FIGS. 3A, 3B, 4A, 4B, 5A and 5B are diagrammatic representations of a method of manufacturing the sheets 22.

FIGS. 3A and 3B show respectively a plan view and a side view of one of the sheets 22 prior to its formation into a mesh. The sheet 22 in FIGS. 3A and 3B is provided with a plurality of rows 70 of slits 71 extending across the width 73 of the sheet 22.

In FIGS. 4A and 4B, forces represented by the arrows X and Y are applied to opposite ends 72X and 72Y of the sheet 22. The forces cause the sheet 22 to stretch lengthwise, but narrow across its width 73 and to open the slits 71 into a plurality of diamond shaped apertures 68 extending across the sheet 22.

FIG. 5B shows a side view of the sheet 22 in FIG. 5A and it can be seen that material of the sheet 22 extends out of the main plane thereof. As the sheet 22 is stretched, the flattened wires 62 twist slightly out of the plane of the sheet 22, giving the sheet 22 a front face 86 and a rear face 88.

Figure 6:
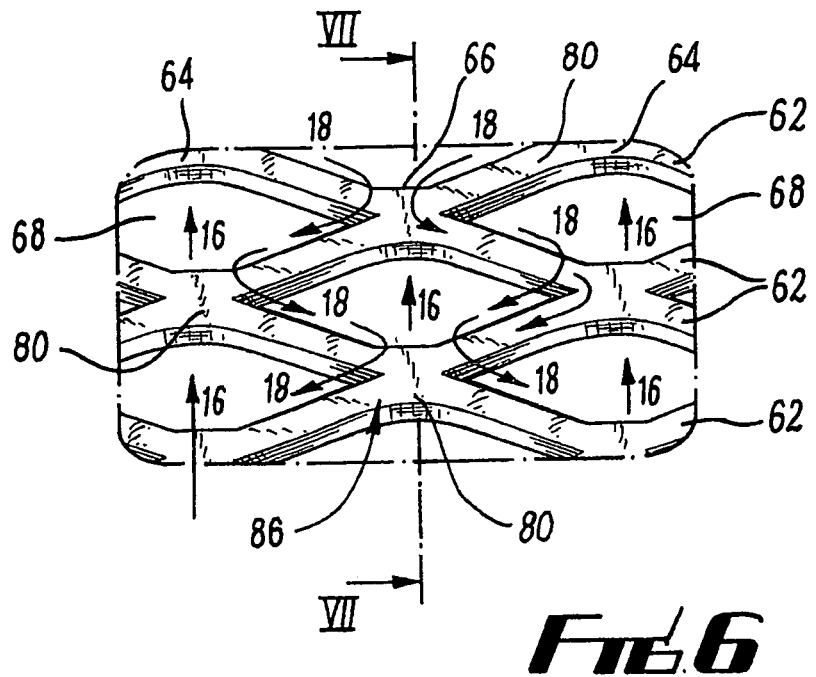
FIG. 6 shows an enlarged detail front view of part of the meshed sheet in use.
Figure 7:
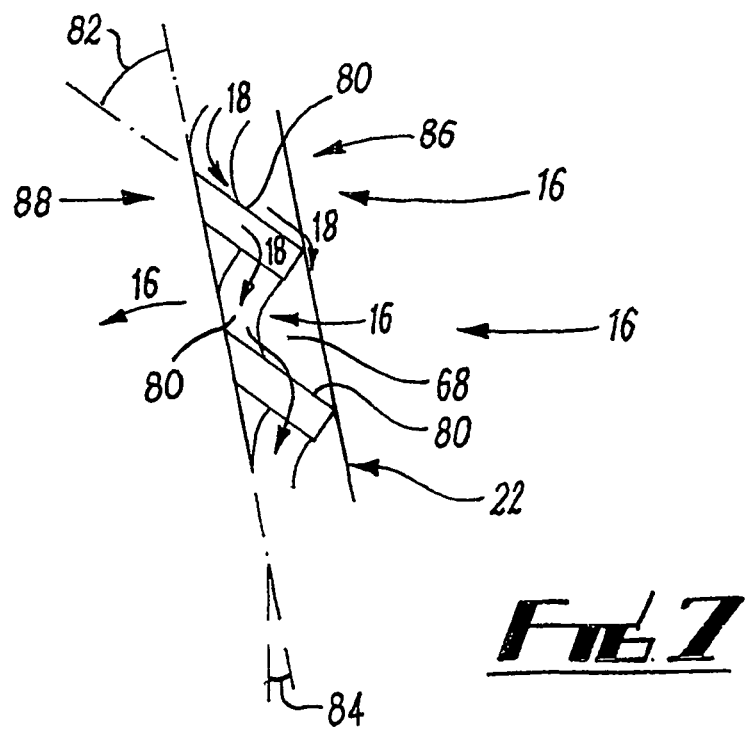
FIG. 7 is a side cross sectional detail view along line VII-VII of FIG. 6 showing the meshed sheet in use.

FIGS. 6 and 7 show the sheet 22 in use. Viewed on the front face 86, the flattened wires 62 each include a fluid contact surface 80, each of the fluid contact surfaces 80 forming a substantially continuous surface with the adjoining fluid contact surfaces 80 of adjacent flattened wires 62. With the plane of the sheet 22 substantially vertical, the fluid contact surfaces 80 are directed generally upwardly.

As shown in FIG. 7, each fluid contact surface 80 is orientated at a first angle 82 to the sheet 22, the first angle being between 5° and 85°. In one example the first angle could be between 30° and 50°.

Each sheet 22 is orientated at a second angle 84 to the vertical, the second angle 84 being between 0° and 45° and more preferably between 5° and 16°. In one example the second angle 84 could be substantially 11°.

In use a gas flows along the gas flow pathway 16 through the apertures 68. A fluid such as water, which in one example could be seawater, flows along the liquid flow pathway 18 over the continuous fluid contact surfaces 80 and is brought into intimate contact with the gas thereby. The liquid spreads out thinly over the fluid contact surfaces 80 to wet the surfaces 80 by virtue of surface tension and gravity. It has been found that the orientation of the fluid contact surface 80 as defined by the first angle 82 and the second angle 84 and the continuous nature of the fluid contact surfaces 80 permits a relatively large cooling/cleaning effect to be obtained in a relatively small space.

It will be noted that the front and rear faces 86, 88 are dissimilar when considered with respect to the liquid flow pathway 18 as will be apparent to a skilled person from a consideration of FIG. 7. FIG. 2A is a view on the rear face 88. Any liquid flowing down this face 88 would be likely to flow through the sheet 22 to the front face 86 or be shed from the rear face 88. The applicant has realised that by careful orientation of the sheets 22, a matrix arrangement 20 having considerable advantages over conventional arrangements can be provided. The sheets 22 can be produced economically. The gas flow has a relatively low pressure drop. The efficiency of heat transfer and/or cleaning is relatively high. The arrangement can be used to cool and/or clean a variety of gases. The design is simple yet robust.

Various modifications can be made without departing from the scope of the invention, for example, the number of rows of the channels 22 can be varied. The mesh size, thickness and material can be varied to suit the use of the matrix arrangement. The apertures formed could be of any suitable size or shape. The matrix arrangement could include any suitable number of sheets, arranged in any suitable configuration.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An assembly comprising a first pathway for a first fluid, the first fluid being a gas, a second pathway for a second fluid, the second fluid being a liquid, wherein the first and second pathways cross each other at a fluid crossing region, the assembly including a matrix arrangement disposed at said fluid crossing region, the matrix arrangement allowing the first and second fluids to contact one another, the matrix arrangement comprising a plurality of generally planar sheets generally aligned with the second pathway, each sheet defining a plurality of apertures for the flow of the first fluid such that the first fluid crosses the second fluid in a direction transverse to the flow of the second fluid along a segment of the first pathway between a first aperture in a first sheet and a second aperture in a second sheet generally parallel to the first sheet, and wherein the first fluid must pass through the apertures in order to flow along the first pathway and the second fluid may flow along the second pathway without passing through the apertures.

2. An assembly according to claim 1, in which the assembly includes a fluid exhaust means to exhaust the first fluid from the assembly, the fluid exhaust means include a separator to separate the second fluid from the first fluid.

3. An assembly according to claim 1, in which the assembly includes a fluid exhaust means to exhaust the first fluid from the assembly, the fluid exhaust means including a vane member to slow the first fluid and allow the entrained second fluid to separate therefrom.

4. An assembly according to claim 1, in which the assembly includes a fluid exhaust means to exhaust the first fluid from the assembly, the fluid exhaust means including a separation chamber.

5. An assembly according to claim 1, in which the assembly comprises a fluid guide means for guiding the first and second fluids, the fluid guide means comprising a generally cylindrical guide member, which extends around the fluid contact arrangement, the cylindrical guide member comprising inner and outer skins, the second fluid pathway extending between the inner and outer skins.

6. An assembly according to claim 1, in which spray means are provided to spray further second fluid onto the first fluid exiting from the fluid contact arrangement.

7. An assembly according to claim 1, wherein the sheets define at least one channel therebetween, along which the second fluid flows in use.

8. An assembly according to claim 7, in which the sheets are arranged so that the or each channel has a diamond shaped profile.

9. An assembly according to claim 7, in which the or each channel is elongate, and is arranged at substantially a second angle to the vertical, which is between 5° and 16°.

10. An assembly according to claim 1, wherein each sheet comprises a mesh composed of a plurality of elongate members, the elongate members engaging adjacent elongate members intermittently to define said apertures in the sheet.

11. An assembly according to claim 10, wherein each elongate member has a fluid contact surface, which in use contacts the second fluid, the fluid contact surface of one elongate member forms a substantially continuous surface with the fluid contact surfaces of adjacent elongate members, the fluid contact surfaces of the elongate members are oriented at a first angle to the generally planar sheet of which they form part, the first angle being between 30° and 50°, and each sheet is oriented at a second angle to the vertical, the second angle being between 5° and 16°.

12. An assembly according to claim 1, in which at least one sheet is corrugated to define channels along which the second fluid flows in use.

13. An assembly according to claim 1, wherein the first pathway is defined by a first fluid flow inlet portion and a first fluid flow outlet portion and the sheets are disposed transverse to the first fluid flow inlet portion and the first fluid flow outlet portion.

14. An assembly according to claim 1, wherein the first pathway is substantially horizontal and the sheets are oriented at an angle between 5° and 16° to vertical.

15. An assembly according to claim 1, wherein the first pathway is substantially horizontal, the second pathway is defined by a second fluid flow inlet portion and a second fluid flow outlet portion, the second fluid flow outlet portion is below the second fluid flow inlet portion in use, and the sheets are disposed between the second fluid flow inlet portion and the second fluid flow outlet portion.

16. A method comprising
  passing a first fluid along a first pathway, the first fluid being a gas;
  passing a second fluid along a second pathway, the second fluid being a liquid, the first and second pathways crossing each other at a fluid crossing region at which a matrix arrangement is disposed, the matrix arrangement comprising a plurality of generally planar sheets and generally aligned with the second pathway, each sheet defining a plurality of apertures for the flow of the first fluid such that the first fluid crosses the second fluid in a direction transverse to the flow of the second fluid along a segment of the first pathway between a first aperture in a first sheet and a second aperture in a second sheet generally parallel to the first sheet, wherein the first fluid must pass through the apertures in order to flow along the first pathway and the second fluid may flow along the second pathway without passing through the apertures,
  allowing the first and second fluids to contact one another by means of the fluid transfer arrangement to effect heat transfer and/or cleaning,
  causing the first fluid to flow through the apertures in the sheet; and
  causing the second fluid to flow over fluid contact surfaces of the sheet so that the first and second fluids cross one another, wherein the method comprises passing the first fluid through the matrix arrangement along the first pathway generally transverse to the aforesaid sheet.

17. A method as claimed in claim 16, wherein the sheets define at least one channel therebetween, the method comprising passing the second fluid along the channel.

18. A method as claimed in claim 16, comprising the step of exhausting the first fluid from the assembly through fluid exhaust means.

19. A method as claimed in claim 18, wherein the step of exhausting the first fluid comprises the step of passing the first fluid over a vane member to slow the first fluid and allow the entrained second fluid to separate therefrom.

20. A method as claimed in claim 18, wherein the step of exhausting the first fluid comprises passing the first fluid through a separation chamber.

21. A method as claimed in claim 16, comprising the step of guiding the first and second fluids by means of fluid guide means, the fluid guide means comprising a generally cylindrical guide member, which extends around the fluid contact arrangement, the cylindrical guide member comprising inner and outer skins, the method comprising passing the second fluid along a fluid pathway extending between the inner and outer skins.

22. A method as claimed in claim 16, comprising the step of spraying by spray means further second fluid onto the first fluid exiting from the fluid contact arrangement.

23. An assembly defining a first pathway for a gas and a second pathway for a liquid, such that first pathway and the second pathway cross each other at a fluid crossing region, the assembly comprising at least one generally planar sheet having a first surface and a second surface substantially parallel to the first surface and spaced apart from the first surface, the planar sheet disposed along the second pathway such that the fluid flows in contact with each of the first surface and the second surface, and the planar sheet defining an aperture between the first and second surfaces, the aperture disposed substantially transverse to the first pathway such that the gas travels along the first pathway along a segment between the fluid contacting the first surface to the fluid contacting the second surface.

* * * * *